Nov. 14, 1961     L. L. RICE ET AL     3,009,086
CAPACITOR TERMINAL CONNECTION
Filed May 6, 1957
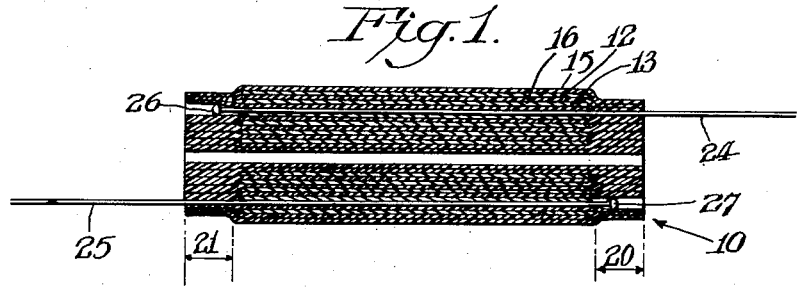
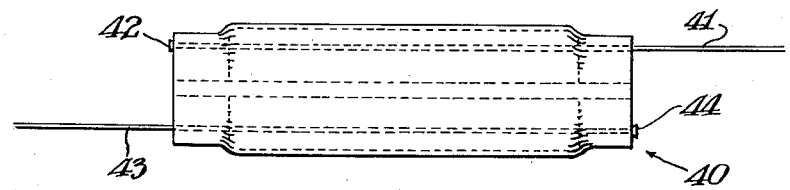
INVENTORS
Livingston Luther Rice &
Donato Francesco Dagnoli
BY
ATTORNEYS United States Patent Office 3,009,086
Patented Nov. 14, 1961

3,009,086
CAPACITOR TERMINAL CONNECTION
Livingston Luther Rice, Williamstown, and Donato Francesco Dagnoli, North Adams, Mass., assignors to Sprague Electric Company, North Adams, Mass., a corporation of Massachusetts
Filed May 6, 1957, Ser. No. 657,315
3 Claims. (Cl. 317—260)

This invention relates to electrical capacitors, and more particularly to the provision of terminal connections for capacitors of convolutely wound construction.

The attaching of leads to a convolutely wound capacitor is usually an awkward operation involving soldering or the like where the leads are to withstand a pull test of any significant magnitude. Although tab-type leads can be more readily provided by merely having such tabs wound into the convolutely wound assembly, tabs are objectionable for many purposes inasmuch as they are not capable of the universal circuit connections which wire leads are capable of, and also because tabs are generally quite thin and therefore relatively fragile.

Among the objects of the present invention is the provision of novel terminal connections which avoid the above and related disadvantages. The above as well as additional objects of the present invention will be more clearly understood from the following description of several of its exemplifications, reference being made to the accompanying drawings, wherein:

FIG. 1 is a sectional view of one form of convolutely wound capacitor assembly embodying the present invention, and FIG. 2 is a front view of a modified form of assembly representative of the present invention.

According to the present invention a convolutely wound capacitor assembly or section has an in situ shrunk resin winding with lead wires laid in the wound assembly, said wires having heads with a diameter at least about 10 mils larger than the body of the wires, and the heads being positioned to engage the shrunk resin and thereby keep the heads from being pulled out of the assembly.

The assembly is preferably wound with metal foils narrower than the resin, the resin projecting beyond each side edge of the foil, and the lead heads inserted in the projecting margins of the wound resin. Alternatively the lead heads can be outside the winding engaging the side edges of the resin.

Referring now to FIG. 1, there is here shown a capacitor assembly made of a convolutely wound pair of metal foils 12, 13 and resin ribbons 15, 16. The foils alternate with the ribbons in the conventional manner so that the foils are insulated from each other and can be oppositely polarized. The resin ribbons are wider than the foils and project on each side of the foils providing margins 20, 21 in which the ribbons shrink down to take up the space provided by the absence of foil. The shrinking is preferably effected after the winding is completed and serves to tighten the winding turns against each other both in the margins 20, 21 where it protects these margins against the penetration of moisture or the like, and in the intervening portion of the winding where it causes the turns to tighten together and become rigidified.

The leads of the present invention are illustrated at 24, 25 and are wires each with an enlarged head 26, 27, laid in across the respective foils during the winding. The heads are located in the resin margins 20, 21 with the leads themselves projecting out beyond the opposing margins, to serve as connectors for soldering or otherwise connecting to a desired circuit.

In a typical example of the construction of FIG. 1, ¼ mil thick aluminum foils each ½ inch wide and 8 inches long were convolutely wound with ¼ mil thick ribbons of polyethylene terephthalate resin each ¾ inch wide and 10 inches long, around an arbor ⅛ inch in diameter. The resin was of the oriented type stretched during its manufacture so that it shrinks about 10% in surface area when heated to between 170 and 200° C. for 5 to 15 minutes. The heads were dip-tinned 18 gauge copper wire with heads 25 mils in diameter. After shrinkage at 200° C. for 15 minutes, each head withstood a pull test of 20 pounds.

The section of FIG. 1 can be encased in a plastic sheath that is molded around it as described in U.S. Patent 2,682,626 granted June 29, 1954, or in a preformed tubular housing of metal, glass, plastic or cardboard, as in U.S. Patent 2,711,498 granted June 21, 1955, U.S. Patent 2,549,770 granted April 24, 1951, and U.S. patent application Serial No. 442,985 filed July 31, 1954, and now abandoned. Alternatively the section can be left unencased in which event it is desirable to securely anchor the outer turn of the winding to make sure it does not unwind. This can be accomplished by cementing the outer turns in place, or by appling around the winding a separate strip carrying cement such as pressure sensitive type adhesive, so that it holds the outer turn against the adjacent turn. The cementing is best carried out after the winding and before the shrinking operation. Instead of cementing, the outer turns of resin can be welded in place by fusing the outermost layers against the adjacent layers in the manner shown, for example, in U.S. patent application Serial No. 237,006 filed July 16, 1951, now U.S. Patent 2,808,357, granted October 1, 1957. The innermost turns of the winding can also be secured together if desired.

The lead anchorage of FIG. 1 is particularly suitable for use with polyethylene terephthalate which is quite strong even in thin films. However, other resins such as polystyrene, polytetrafluoroethylene, polyethylene, polytrifluoromonochloroethylene, cellulose acetate, cellulose acetate-butyrate, polyvinyl acetate can also be used, although with these resins the lead anchorage is not as secure.

FIG. 2 shows a modified capacitor construction according to the invention in which a winding 40 can be identical with the winding of FIG. 1. However, in the construction of FIG. 2 leads 41, 43 are laid across the turns so that their heads and tails extend from opposite edges. The heads 42, 44 are arranged to abut the side edges to thereby keep the leads from being pulled out. This construction is particularly satisfactory for use with leads that are not very stiff, such as copper wire not over about 10 mils in diameter. With such easily bent leads, the assembly will withstand handling without having the lead heads pushed out by force applied against the lead and directed toward the winding. By reason of the position of heads 42, 44, they do not offer significant resistance to such force, and the resulting shifting of the lead in the winding will create an undesirable loose contact unless it is followed by pressure molding such as would be used for the application of a plastic casing around the capacitor.

The constructional variations referred to above in connection with FIG. 1 are also adaptable to FIG. 2. The use of polyethylene therephthalate for the construction of FIG. 2 is also desirable because it is more resistant to adverse influences such as moisture that might find its way into the interior of the windings where the shrinkage of the side margins do not perfectly seal the passage ways through which the leads penetrate.

The present invention can be practiced without aligning the metal foils in the manner shown in FIG. 1. Thus these foils can be offset somewhat from each other and can even have different widths. The same is true of the resin ribbons, although a better appearance is made when the side edges are uniform. The lead heads as indicated above are preferably at least about 10 mils thicker than the leads themselves, in order to show the maximum resistance to being pulled loose. A somewhat smaller thickness difference can be used if the maximum results are not desired. The particular shape of the head is not important as long as it tapers down from its thickest portion at an angle of at least about 20° and preferably 30°. To better resist both pulling and pushing the head should taper in both directions in the construction of FIG. 1. A sharp edge at the point of maximum width can also be used to good advantage especially with polyethylene terephthalate inasmuch as this resin will generally not tear at such an edge. The enlargement need not completely encircle the lead but can be confined to one or more small sectors at its periphery.

The capacitors of the present invention need not be limited to constructions in which there is only one layer of dielectric between opposing foils. Two or three or more resin layers can be used and where there is such a plurality of layers they need not all be of identical composition. Ribbons of different resins can be combined, and in fact one resin ribbon can be laminated with a non-resin layer such as paper.

The capacitor of the present invention can be unimpregnated, such as for use at interelectrode potentials of 100 volts or less, or they can be impregnated for higher voltages. Suitable impregnants are mineral oil, silicone oils, (such as those described in the Obenhaus U.S. patent application Serial No. 591,065 filed June 13, 1956) chlorinated diphenyl, chlorinated naphthalene, castor oil, and the polymer described in U.S. Patent 2,711,498 granted June 21, 1955.

The lead constructions of the present invention can also be used where the capacitors have floating or unconnected foils in addition to the converted foils. Also if the fullest advantages of the invention are not desired, only one terminal lead can be of the type described above, and any remaining leads can be of any other type where maximum pull resistance is not important.

The foils used with the new lead construction can be of any metal such as aluminum, lead, copper, tin, brass or the like.

Obviously many modifications and variations of the present invention are possible in the light of the above teachings. It is, therefore, to be understood that within the scope of the appended claims the invention may be practiced otherwise than as specifically described.

What is claimed is:

1. A capacitor assembly comprising a convolutely wound capacitance section and a terminal lead, said section having shrunken resin films separating and enveloping metallic electrode foils to provide resin margins beyond the lateral edges of said foils, said lead having one end extending from one margin of said section, the other end of said lead having an enlarged head engaging the margin opposite said one margin, and the intermediate portion of said lead contacting one of said foils.

2. The capacitor assembly defined in claim 1 wherein at least one of said resin films is a polyethylene terephthalate film, and said enlarged head is embedded in said opposite margin.

3. The capacitor assembly defined in claim 1 wherein at least one of said resin films is a polyethylene terephthalate film, and said enlarged head is engaged in the side edges of said opposite margin.

References Cited in the file of this patent

UNITED STATES PATENTS

| | | |
|---|---|---|
| 1,862,297 | Butler | June 7, 1932 |
| 1,960,944 | Knudsen | May 29, 1934 |
| 2,537,959 | Beverly | Jan. 16, 1951 |
| 2,579,462 | Barnard et al. | Dec. 25, 1951 |
| 2,785,352 | Netherwood | Mar. 12, 1957 |

FOREIGN PATENTS

| | | |
|---|---|---|
| 270,241 | Great Britain | June 2, 1927 |
| 1,130,812 | France | Feb. 12, 1957 |